United States Patent
Oota et al.

(10) Patent No.: US 6,425,774 B1
(45) Date of Patent: Jul. 30, 2002

(54) ROTARY CONNECTION DEVICE

(75) Inventors: Kouji Oota; Yoshitsugu Tsuji, both of Nagoya (JP)

(73) Assignees: Autonetworks Technologies, Ltd., Aichi; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/707,925

(22) Filed: Nov. 8, 2000

(30) Foreign Application Priority Data

Nov. 11, 1999 (JP) .............................. 11-320950

(51) Int. Cl.[7] .............................................. H01R 3/00
(52) U.S. Cl. ............................................ 439/164; 439/15
(58) Field of Search .................................... 439/164, 15

(56) References Cited

U.S. PATENT DOCUMENTS

| | | | | |
|---|---|---|---|---|
| 4,744,763 A | * | 5/1988 | Suzuki et al. | 439/15 |
| 5,061,195 A | * | 10/1991 | Bolen et al. | 439/164 |
| 5,334,023 A | * | 8/1994 | Schauer et al. | 439/164 |
| 5,487,667 A | * | 1/1996 | Bolen | 439/164 |
| 5,490,793 A | * | 2/1996 | Bolen | 439/164 |
| 5,580,259 A | * | 12/1996 | Bolen et al. | 439/164 |
| 5,674,082 A | * | 10/1997 | Okuhara et al. | 439/164 |
| 5,692,915 A | * | 12/1997 | Ishikawa et al. | 439/169 |
| 5,730,386 A | * | 3/1998 | Yamada et al. | 242/388 |
| 5,904,585 A | * | 5/1999 | Nishikigi et al. | 439/164 |
| 5,975,931 A | * | 11/1999 | Ishikawa | 439/164 |
| 5,980,285 A | * | 11/1999 | Matsumoto | 439/164 |
| 5,980,286 A | * | 11/1999 | Best et al. | 439/164 |
| 6,095,836 A | * | 8/2000 | Bolen et al. | 439/164 |
| 6,109,942 A | * | 8/2000 | Bannai | 439/164 |
| 6,164,994 A | * | 12/2000 | Bolen et al. | 439/164 |
| 6,196,488 B1 | * | 3/2001 | Sakata et al. | 242/388 |
| 6,201,198 B1 | * | 3/2001 | Takahashi | 200/61.54 |

* cited by examiner

Primary Examiner—Tho D. Ta
Assistant Examiner—Edwin A. Leon
(74) Attorney, Agent, or Firm—Oliff & Berridge PLC

(57) ABSTRACT

In a rotary connection device, a rotor and a case are fitted relatively rotatably with a flat cable stored therebetween. The rotor is provided with a plurality of ribs radially on the cable facing surface thereof, with an elastic sheet provided on the lower surface side across the ribs such that the elastic sheet is elastically deformed only at the part contacting with the ribs so as to pressure the flat cable in the axial direction for preventing the backlash thereof.

7 Claims, 3 Drawing Sheets

ROTARY CONNECTION DEVICE

DETAILED DESCRIPTION OF THE PREFERRED EMBODIMENTS

1. Field of the Invention

The present invention relates to a rotary connection device assembled in, for example, a steering device of an automobile, to be used as a means for electrically connecting a steering wheel side (rotary side) and a body side (fixed side).

2. Description of the Related Art

An example of an automobile will be explained. As shown in FIG. 6, a rotary connection device comprises a rotary side member 1 to be rotated integrally with a steering shaft, a fixed side member 2 fixed on the body side (hereinafter, according to common names, the rotary side member 1 is referred to as a rotor, and the fixed side member 2 as a case), a flat cable 4 provided in a cable storage space 3 formed therebetween, and a terminal (not illustrated) for drawing out the flat cable 4 to the outside, so as to be used for connection of electric parts of a horn switch, an air bag, or the like.

In FIG. 6, the numeral 5 denotes a cylindrical rotor boss provided in the center part of the rotor 1, projecting to the case 2 side such that the steering shaft is inserted through the rotor boss 5. Moreover, the flat cable 4 is provided in the state spirally wound around the rotor boss 5. The numeral 6 denotes a stopping ring for interlocking the rotor 1 and the case 2 in the axial direction.

However, in the rotary connection device, a problem is involved in that the cable 4 swayed in the axial direction due to vibration of the car body, or the like, is collided against the rotor 1 or the case 2 so as to generate a noise.

Conventionally, as a countermeasure therefor, a technique for restraining the backlash of the cable in the axial direction by providing a plastic sleeve formed in a cylindrical shape with a collar in the state with the collar part elastically pressuring the flat cable in the axial direction as disclosed in JP-B-62-124785 has been proposed.

However, according to the prior art, since the elastic deformation of the entirety of the collar part according to the contact pressure with the cable is utilized, it is extremely difficult to both satisfy the request for a large elastic deformation stroke including a margin for absorbing a part error and an assembly error, and the request for ensuring a necessary and sufficient pressuring force. Therefore, problems are generated in that the backlash prevention effect for the cable is lowered due to an insufficient pressuring force, or in contrast, that a free movement of the cable is inhibited or the elastic deformation stroke is insufficient due to an excessive pressuring force.

As another technique to take its place, it is conceivable to provide a flexible elastic member such as a foamed urethane, capable of taking a large elastic deformation stroke, molded in a thick sheet-like shape, on the inner surface of a rotor. However, even in this case, as long as the elastic deformation motion of the entirety of the elastic member is utilized, it is also extremely difficult to both satisfy a necessary deformation stroke and an appropriate pressuring force, partially due to the limit on the elastic member thickness.

SUMMARY OF THE INVENTION

Accordingly, an object of the invention is to provide a rotary connection device capable of ensuring both necessary elastic deformation stroke and appropriate pressuring force in an elastic member in a configuration wherein a cable is pressured elastically in the axial direction by the elastic member.

A first aspect of the invention is a rotary connection device comprising first and second members fitted in the state both relatively rotatable around the same axis with a cable storage space formed therebetween such that a cable for electric conduction stored in the cable storage space in the wound state, wherein an elastic member for elastically pressuring the cable in the axial direction against the cable facing surface of at least one of the first and second members, facing the cable in the axial direction is provided in the state partially elastically deformable in the axial direction with respect to the entirety of the cable facing surface by the contact pressure with the cable.

A second aspect of the invention is the rotary connection device according to the first aspect, wherein the first member is a fixed side member mounted on a fixed part, the second member is a rotary side member mounted on a rotary part, and the cable is a flat cable, with the flat cable spirally wound in the cable storage space.

A third aspect of the invention is the rotary connection device according to the first or second aspect, wherein projections are provided in plural parts of the cable facing surface of the member provided with the cable, and a sheet-like elastic member is provided across the projections in the state elastically deformable at the part contacting with the projections.

A fourth aspect of the invention is the rotary connection device according to the third aspect, wherein a plurality of ribs are arranged as the projections radially with respect to the rotation center of the member provided with the cable.

A fifth aspect of the invention is the rotary connection device according to the third or fourth aspect, wherein the elastic member is provided on the cable on the side of either of the first and second members provided above, independently therefrom.

A sixth aspect of the invention is the rotary connection device according to the first or second aspect, wherein the elastic member is provided at plural points on the cable facing surface.

A seventh aspect of the invention is the rotary connection device according to any of the first to sixth aspects, wherein a sliding layer for smoothly sliding the cable is provided on the surface of the elastic member contacting with the cable.

An eighth aspect of the invention is the rotary connection device according to the seventh aspect, wherein the sliding layer is provided on the substantial entirety of the cable facing surface.

According to the configuration, since the elastic member for pressuring the cable in the axial direction for restraining the backlash is elastically deformed partially with respect to the cable facing surface according to the contact pressure with the cable (only the part in the elastic member provided across the plurality of the projections contacting with the projections is deformed elastically in the third and fourth aspects, and the plurality of the elastic members provided dispersively are elastically deformed independently in the sixth aspect), compared with the case of elastic deformation of the elastic member in the entire area of the cable facing surface, the elastic deformation stroke can be large. Besides, the pressuring force of the elastic member can be adjusted freely according to the area wherein the contact pressure is applied, or the like.

That is, antinomic demand for a large elastic deformation stroke including the margin for absorbing the errors, and an appropriate pressuring force not restraining the free movement of the cable can easily be satisfied at the same time.

Accordingly, while maintaining the rotary connection function inherent to the rotary connection device, generation of noises due to sway of the cable in the axial direction can be restrained. In particular, a high effect can be provided in a rotary connection device to be assembled in a steering device of an automobile with much vibration.

Moreover, according to the configuration of the third, fourth, and fifth aspects, since the elastic member is provided across the plurality of the projections (ribs in the fourth aspect), compared with the case of partially providing the same (the sixth aspect), the assembly operation can be facilitated. In particular, the effect thereof is significant in the fifth aspect wherein the elastic member only needs to be placed on the cable.

In contrast, according to the configuration of the sixth aspect, since the elastic members are elastically deformed independently, the deformation stroke and the pressuring force can be adjusted easily as well as the adjustment width to the optimal value can be wide.

In contrast, according to the configuration of the seventh and eighth aspects, since a sliding layer is provided on the contact surface of the elastic member with respect to the cable, even in the case the pressuring force is slightly strong, or the like, the cable movement cannot be inhibited. In particular, since the sliding layer is provided on the substantial entirety of the cable facing surface in the eighth aspect without a part lacking the sliding effect of the sliding layer, the free movement of the cable can certainly be ensured.

DETAILED DESCRIPTION OF THE PREFERRED EMBODIMENTS

Embodiments of the invention will be explained with reference to FIGS. 1 to 5.

In the following embodiments, rotary connection devices to be assembled in an automobile steering device are provided as an example as in the description of the prior art. First Embodiment (see FIGS. 1 to 3)

Figure 1:
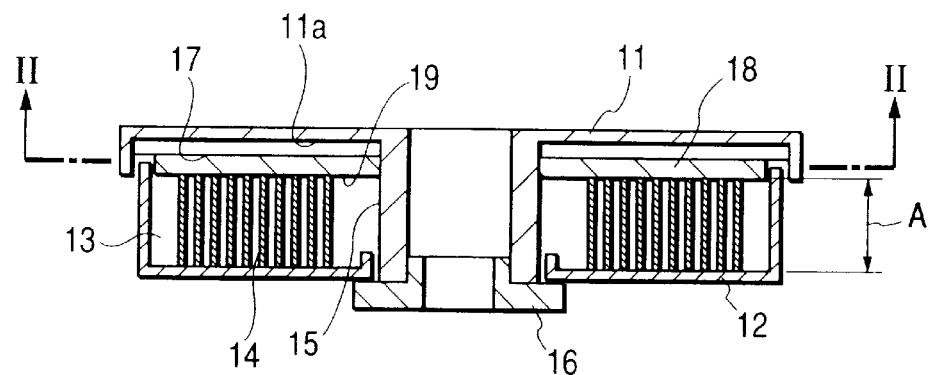
FIG. 1 is a cross-sectional view of a rotary connection device according to a first embodiment of the invention.
Figure 2:
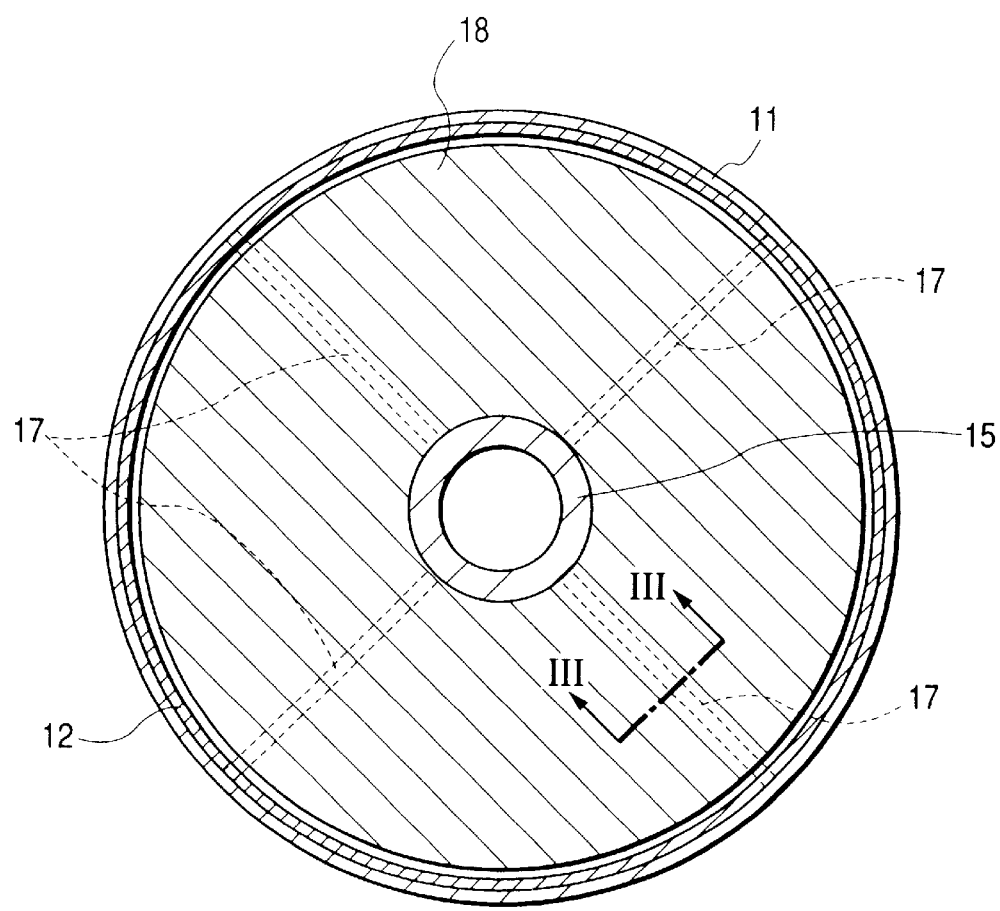
FIG. 2 is a cross-sectional view taken on the line II—II of FIG. 1.
Figure 6:
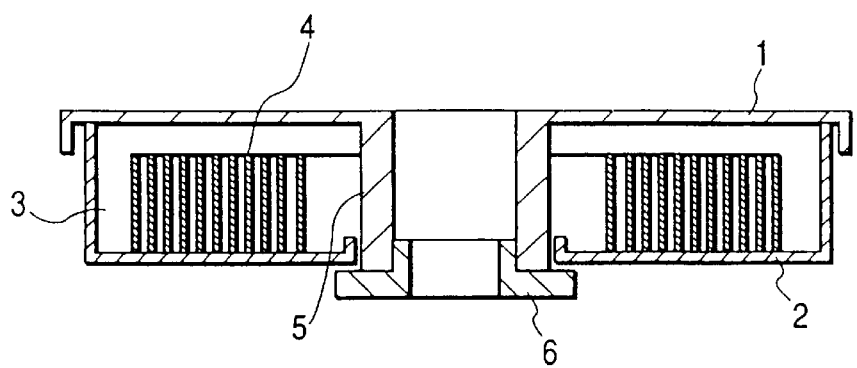
FIG. 6 is a cross-sectional view of a conventional rotary connection device.

Similar to the conventional device shown in FIG. 6, the rotary connection device basically comprises a rotor to be rotated integrally with a steering shaft (rotary side member) 11, a case to be fixed on the body side (fixed side member) 12, a flat cable 14 provided in a cable storage space 13 formed therebetween, and a terminal (not illustrated) for drawing out the flat cable 14 to the outside as shown in FIGS. 1 and 2.

The numeral 15 denotes a cylindrical rotor boss, and the numeral 16 a stopping ring for interlocking the rotor 11 and the case 12 in the axial direction.

Bridge-like ribs 17 . . . , are provided at plural points with a certain distance in the circumferential direction (in the figure, at four points), radially elongating between the rotor boss 15 and the circumferential rim part on the inner surface (cable facing surface facing the cable 14 in the axial direction) 11a of the rotor 11.

The ribs 17 . . . , can be formed integrally with the rotor 11, or provided as an independent member mounted on the rotor 11 by engagement, adhesion, or another means.

Moreover, an elastic sheet 18 is provided across the ribs 17 . . . on the lower surface side of the ribs 17 . . . such that the flat cable 14 is pressured toward the bottom surface of the case 12 in the axial direction by the elastic sheet 18.

A sliding layer (film) 19 made from a flexible plastic material with a good sliding property such as PET (polyethylene terephthalate) is provided on the entire area of the lower surface of the elastic sheet 18 by adhesion, or the like.

In this case, the sizes of each part are set such that the distance A between the lower surface of the elastic sheet 18 (lower surface of the sliding layer 19) in the natural height state (non-deformed state) and the case inner surface is smaller than the width size of the flat cable 14.

The elastic sheet is formed in a thick disc-like shape with such a relatively soft elastic material (such as foamed urethane, and foamed rubber) that absorbs the part error and the assembly error as well as provides a relatively low pressuring force so as not to hinder the free movement of the cable 14.

The elastic sheet 18 can be provided in the state merely placed on the flat cable 14 so as to be interposed between the cable 14 and the ribs 17 . . . or mounted on the lower surface of the ribs 17 . . . by adhesion, or the like.

Moreover, the elastic sheet 18 is provided on the substantial entirety except the circumferential rim part of the cable facing surface 11a such that the sheet circumferential end is at the outer circumferential side with respect to the cable outermost circumferential part with the spirally wound flat cable 14 in the most spread state. Accordingly, the risk of the cable outer circumference in the spread state hooking on the sheet circumferential end so as not to be returned can be avoided.

Figure 3A:
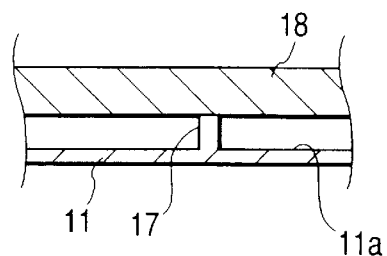
FIGS. 3A and 3B are enlarged cross-sectional views taken on the line III—III of FIG. 2.
Figure 3B:
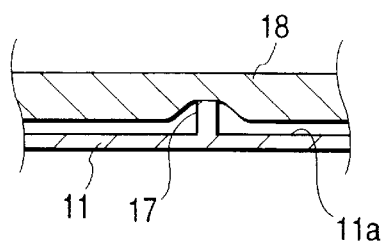

FIG. 3A shows the state of the device before assembly, that is, in the state before applying a pressure on the flat cable 14 by the elastic sheet 18. In the assembled state, the elastic sheet 18 comes in contact with the flat cable 14 so as to pressure, and it is elastically deformed by the reactive force as shown in FIG. 3B.

In this case, the elastic sheet 18 is elastically deformed (partially deformed) only at the part contacting with the ribs 17 . . . drastically basically by a small force. Therefore, it is possible to pressure the flat cable 14 for restraining the backlash thereof in the axial direction with a minimally necessary small force so as not to prevent the free movement of the cable 14 as well as to ensure a sufficient elastic deformation stroke including the margin for absorbing the tolerance.

Besides, since the sliding layer 19 is provided on the lower surface of the elastic sheet 18, even in the case the pressuring force of the elastic sheet 18 is slightly stronger than a designed value, or the like, there is no risk of posing an adverse effect on the cable 14 movement.

Moreover, since the elastic deformation degree (pressuring force and deformation stroke) of the elastic sheet 18 can be adjusted in a wide range according to the selection of the sheet 18 material, the number of installation points of the ribs 17 . . . , and the total contact area thereof with respect to the elastic sheet 18, or the like, the above-mentioned optimal conditions can be satisfied certainly and easily.

Figure 4:
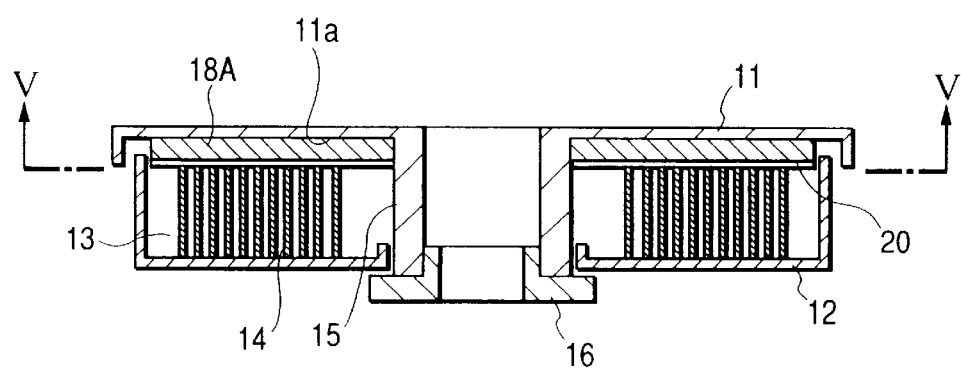
FIG. 4 is a cross-sectional view of a rotary connection device according to a second embodiment of the invention.
Figure 5:
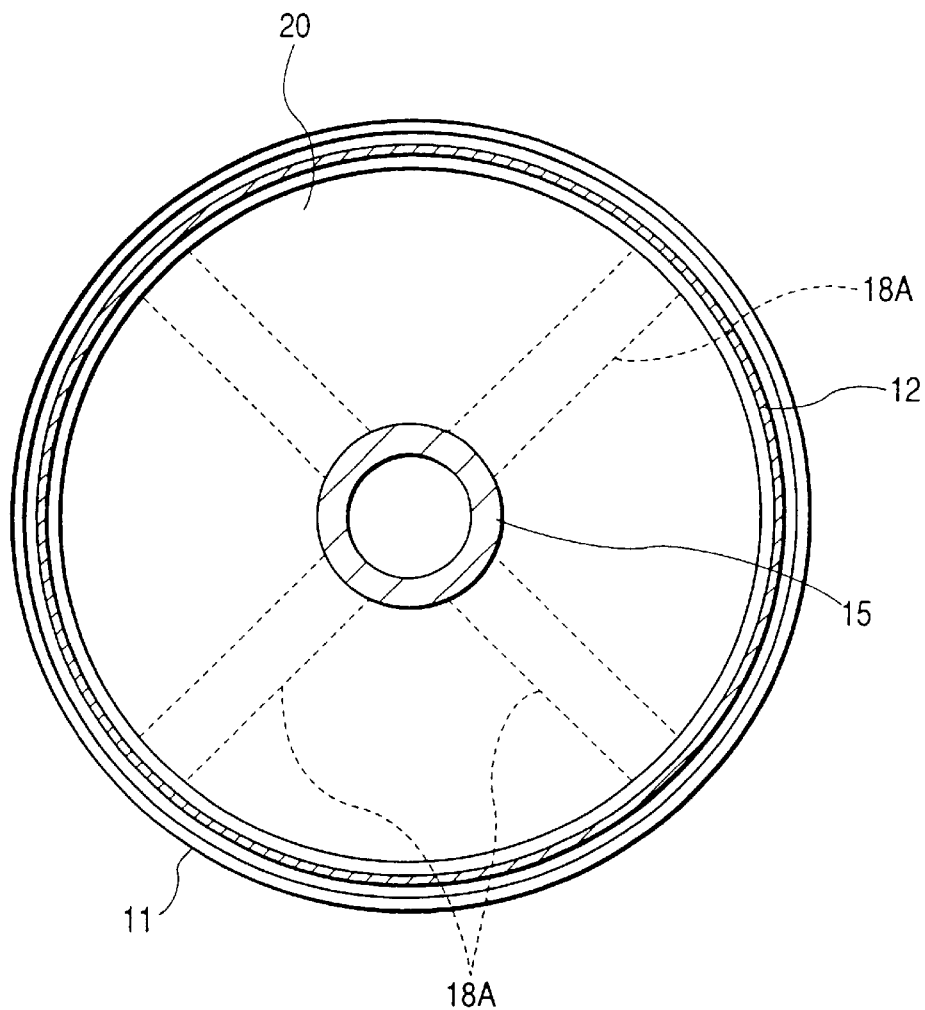
FIG. 5 is a cross-sectional view taken on the line V—V of FIG. 5.

Second Embodiment (see FIGS. 4, 5)

Explanation will be given only for the points different from those of the first embodiment.

Although a plurality of the ribs 17 . . . are provided on the cable facing surface 11a and the elastic sheet is provided on the substantial entirety of the cable facing surface 11a across the ribs 17 . . . in the first embodiment, band-like elastic sheets 18A are provided radially on the cable facing surface 11a at plural points (in the figure, four points) in the circumferential direction with an equal distance in the second embodiment.

Moreover, a sliding plate (layer) 20 made from a flexible plastic material with a good sliding property such as PET is provided on the entire area of the lower surface of the elastic sheets 18A . . . Similar to the sliding layer 19 in the first embodiment, the sliding plates 20 serve for smoothly sliding the flat cable 14, however, it is formed in a disc-like shape thicker than the sliding layer 19 for providing an elasticity stronger than that of the sliding layer 19.

The sliding plate 20 can be fixed on the elastic sheets 18A . . . , or can be just interposed between the elastic sheets 18A . . . and the cable 14.

According to the configuration, basically the same effects as in the first embodiment can be achieved as well as since the elastic sheets 18A . . . are elastically deformed individually, the deformation stroke and the pressuring force can be adjusted easier than the case of the first embodiment as well as the adjustment width toward the optimal value can be wider.

As a modified embodiment of the first embodiment, in place of the radial ribs 17 . . . , projections of other shapes such as columnar, cylindrical, and arc-like can be provided partially on the cable facing surface 11a.

Moreover, although the elastic sheets 18, 18A are provided on the rotor 11 side in the above-mentioned embodiments, the elastic sheets 18, 18A can be provided on the case 2 side, or on both rotor side and case side.

In contrast, although examples of a rotary connection device to be assembled in an automobile steering device are explained in the above-mentioned embodiments, the invention can be adopted widely in rotary connection devices with a cable stored between relatively rotatable first and second members, including rotary connection devices to be assembled in domestic electric appliances.

As heretofore explained, according to the invention, since the elastic member for pressuring the cable in the axial direction for restraining the backlash is provided on the cable facing surface of at least one of the relatively rotatable first and second members in the state elastically deformed partially with respect to the cable facing surface according to the contact pressure with the cable, compared with the case of elastic deformation of the elastic member in the entire area of the cable facing surface, the elastic deformation stroke can be large. Besides, the pressuring force of the elastic member can be adjusted freely according to the area wherein the contact pressure is applied, or the like.

That is, antinomic demand for a large elastic deformation stroke including the margin for absorbing the errors, and an appropriate pressuring force not restraining the free movement of the cable can easily be satisfied at the same time.

Accordingly, while maintaining the rotary connection function inherent to the rotary connection device, generation of noises due to sway of the cable in the axial direction can be restrained. In particular, a high effect can be provided in a rotary connection device to be assembled in a steering device of an automobile with much vibration.

Moreover, according to the configuration of the third, fourth, and fifth aspects, since the elastic member is provided across the plurality of the projections (ribs in the fourth aspect), compared with the case of partially providing the same (the sixth aspect), the assembly operation can be facilitated. In particular, the effect thereof is significant in the fifth aspect wherein the elastic member only needs to be placed on the cable.

In contrast, according to the configuration of the sixth aspect, since the elastic members are elastically deformed independently, the deformation stroke and the pressuring force can be adjusted easily as well as the adjustment width to the optimal value can be wide.

In contrast, according to the configuration of the seventh and eighth aspects, since a sliding layer is provided on the contact surface of the elastic member with respect to the cable, even in the case the pressuring force is slightly strong, or the like, the cable movement cannot be inhibited. In particular, since the sliding layer is provided on the substantial entirety of the cable facing surface in the eighth aspect, the free movement of the cable can certainly be ensured without a part lacking the sliding effect of the sliding layer.

What is claimed is:

1. A rotary connection device comprising:

a first and second member rotatably connected on a same axis forming a cable storage area:

a cable stored in the cable storage area in a wound state;

a plurality of projections provided in plural parts of a cable facing surface of the first or second member containing the cable; and an elastically deformable sheet-like elastic member placed across the plurality of projections to provide elastic pressure on a cable in an axial direction against a cable facing surface of at least one of the first and second members, wherein contact pressure is provided to the cable by the elastic members and the cable facing surface in the axial direction.

2. The rotary connection device according to claim 1, wherein the first member is a fixed side member mounted on a fixed part, the second member is a rotary side member mounted on a rotary part, and the cable is a flat cable, with the flat cable spirally wound in the cable storage space.

3. The rotary connection device according to claim 1, wherein the projections are a plurality of ribs radially arranged with respect to a rotation center of the member provided with the cable.

4. The rotary connection device according to claim 1, wherein the elastic member is provided on the cable on a side of either the first and second members, independently therefrom.

5. The rotary connection device according to claim 1, wherein the elastic member is connected at plural points on the cable facing surface.

6. The rotary connection device according to claim 1, wherein a sliding layer for smoothly sliding the cable is provided on the surface of the elastic member connected to the cable.

7. The rotary connection device according to claim 6, wherein the sliding layer is provided on the substantial entirety of the cable facing surface.

* * * * *